US010460400B2

(12) United States Patent
Aziz et al.

(10) Patent No.: US 10,460,400 B2
(45) Date of Patent: Oct. 29, 2019

(54) SYSTEMS AND METHODS FOR PROVIDING ANNIVERSARY INFORMATION

(71) Applicant: Facebook, Inc., Menlo Park, CA (US)

(72) Inventors: Omid Aziz, San Francisco, CA (US); Yuankai Ge, San Mateo, CA (US); Bradley Wu, Mountain View, CA (US); Stefanie Lynn Ostrowski, San Francisco, CA (US); John Jarman Rogers, Jr., San Francisco, CA (US); Michael Benjamin Nowak, San Francisco, CA (US); Jonathan B. Gheller, Menlo Park, CA (US); Evan Gabriel Brooks, San Francisco, CA (US); Brady R. Lauback, Menlo Park, CA (US); Matthew Ethan Warshauer, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 409 days.

(21) Appl. No.: 14/961,776

(22) Filed: Dec. 7, 2015

(65) Prior Publication Data
US 2017/0161388 A1    Jun. 8, 2017

(51) Int. Cl.
G06Q 50/00    (2012.01)
G06Q 10/10    (2012.01)
(52) U.S. Cl.
CPC .......... G06Q 50/01 (2013.01); G06Q 10/109 (2013.01)
(58) Field of Classification Search
CPC . G06Q 10/109; G06Q 50/01; G06F 17/30867
USPC ...................................................... 707/748
See application file for complete search history.

(56) References Cited

U.S. PATENT DOCUMENTS

| 8,856,232 B1* | 10/2014 | Swerdlow | G06Q 10/10 709/204 |
| 2008/0154632 A1* | 6/2008 | Jacobi | G06Q 30/0601 705/26.1 |
| 2010/0159967 A1* | 6/2010 | Pounds | H04L 51/14 455/466 |
| 2012/0023128 A1* | 1/2012 | Sammon | G06F 16/41 707/769 |
| 2014/0181852 A1* | 6/2014 | Jaghori | H04N 21/2625 725/19 |
| 2014/0207860 A1* | 7/2014 | Wang | H04L 65/403 709/204 |
| 2014/0270571 A1* | 9/2014 | Dwan | H04N 1/00453 382/276 |
| 2015/0101026 A1* | 4/2015 | Kraus | H04W 4/21 726/4 |
| 2016/0189211 A1* | 6/2016 | Bhagwan | G06Q 30/0255 705/14.53 |
| 2016/0378760 A1* | 12/2016 | Braz | G06Q 10/107 707/728 |

* cited by examiner

Primary Examiner — Phong H Nguyen
(74) Attorney, Agent, or Firm — Sheppard Mullin Richter & Hampton LLP

(57) ABSTRACT

Systems, methods, and non-transitory computer-readable media can determine one or more social networking system anniversary events associated with a first user, the anniversary event having a month and a day that is identical to the current month and day. The one or more anniversary events are filtered using filtering criteria. An indication, such as a notification or a promotion, relating to the one or more anniversary events is generated based on satisfaction of the filtering criteria.

14 Claims, 10 Drawing Sheets

SYSTEMS AND METHODS FOR PROVIDING ANNIVERSARY INFORMATION

FIELD OF THE INVENTION

The present technology relates to the field of social networks. More particularly, the present technology relates to techniques for providing social network anniversary information.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. When knowledge of a user is gained, content, advertising, and potentially other services can be optimized for presentation to the user. Such potentially helpful knowledge about the user can include information about the user as an individual as well as the user's activity on the social network.

SUMMARY

Various embodiments of the present disclosure can include systems, methods, and non-transitory computer readable media configured to determine one or more anniversary events associated with a first user, the one or more anniversary events having occurred on an anniversary date that has a month and a day that is identical to a current month and a current day. The one or more anniversary events are filtered using filtering criteria. An indication relating to the one or more anniversary events is generated based on satisfaction of the filtering criteria.

In an embodiment, the filtering criteria comprise a negative story filter that filters out stories that involve at least one of an ex-friend, an ex-significant other, or a deceased user.

In an embodiment, the filtering of the one or more anniversary events comprises associating each of the one or more anniversary events with at least one of a value or a ranking; associating the filtering criteria with at least one of a threshold value or a threshold ranking; and filtering out an anniversary event that fails to satisfy at least one of the threshold value or the threshold ranking.

In an embodiment, the indication is a promotion that is presented in a news feed associated with the first user.

In an embodiment, the news feed comprises one or more news feed stories, and the presentation of the one or more news feed stories is based on a news feed algorithm value associated with each news feed story. The promotion is assigned a news feed algorithm value that guarantees presentation of the promotion in the news feed.

In an embodiment, it is determined whether or not a frequency cap is satisfied, and the generating the indication relating to one or more anniversary events occurs based on satisfaction of the frequency cap.

In an embodiment, the one or more anniversary events comprise one or more friendship anniversaries. A friendship anniversary relates to the date on which the first user became connected with a second user on a social networking system.

In a further embodiment, the systems, methods, and non-transitory computer readable media comprise providing a close friend friendship anniversary story in a first presentation, and providing a regular friend friendship anniversary in a second presentation different from the first presentation.

In an embodiment, a close friend associated with a close friend friendship anniversary story is determined by at least one of: a friendship coefficient that is indicative of the level of interaction between the first user and a friend on the social networking system, or a designation made by the first user indicating that the friend on the social networking system is a close friend.

In an embodiment, the first presentation of the close friend friendship anniversary story comprises one or more images including both the first user and the close friend.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
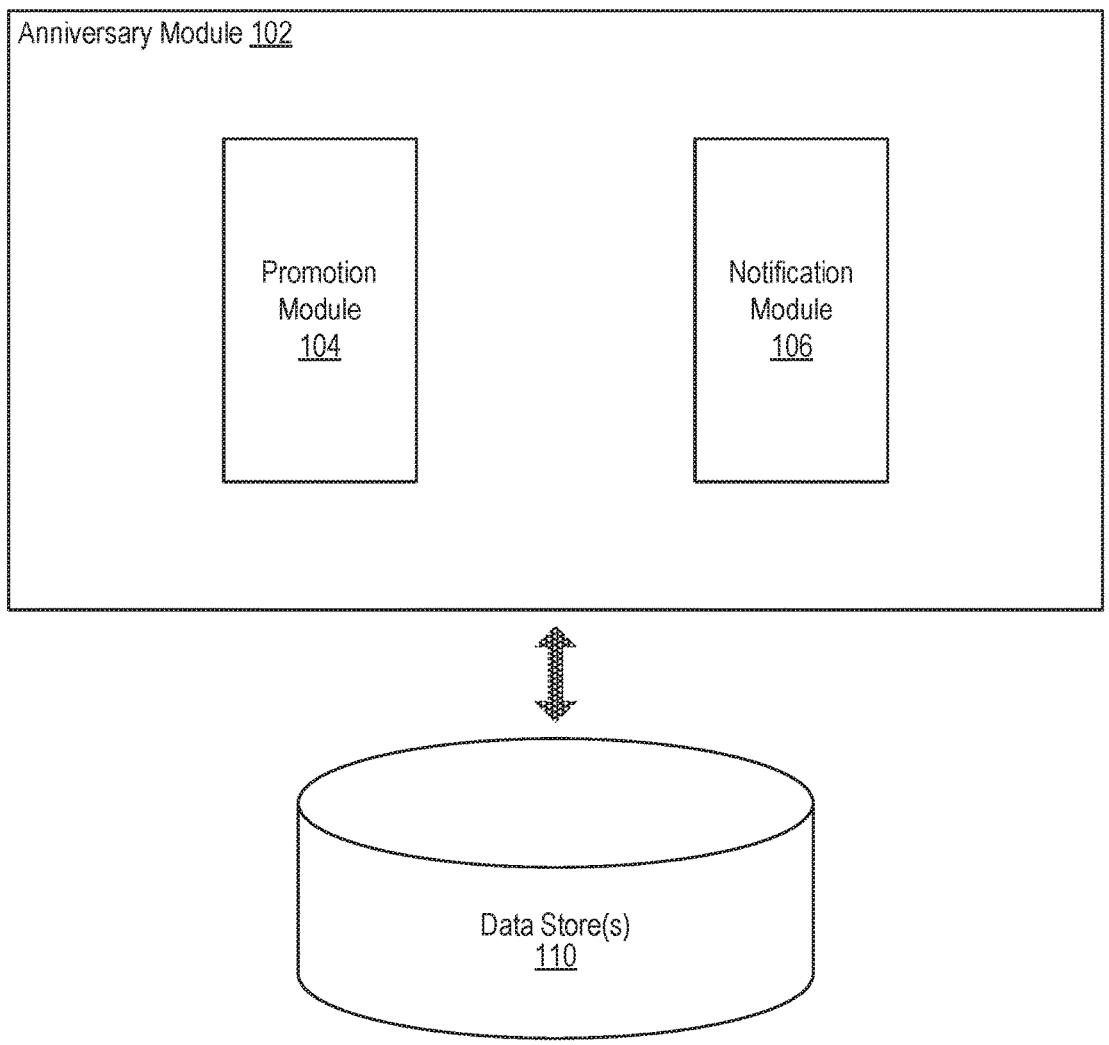
FIG. 1 illustrates an example system including an example anniversary module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Anniversary Event Determination and Presentation

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system. Users also can access and experience content of almost every variety of type and form.

As a user utilizes and interacts on a social networking system, the system receives and stores more information about a user and learns more about the user. The profile and interactions of the user as well as the profile and interactions of connections of the user can provide important information about the user. For example, interactions on a social networking system can relate to an event in a user's life that originated outside the social networking system (e.g., graduations, marriages, birth of a child, etc.). In addition, interactions on a social networking system may also relate to events that originated within the system itself. Information regarding such interactions can be leveraged by the social networking system to optimize the presentation of relevant content, advertising, and other services to the user to enhance the user's experience.

However, despite the availability of such information, it continues to be a challenge for social networking systems rooted in computer technology to utilize that information to provide content that is of interest to users. For example, the sheer magnitude of information maintained by the social networking system can render retrieval of such information by a user difficult or cumbersome. As another example, an attempt by the social networking system to automatically retrieve and present relevant information for the user can result in a large volume of available information that could overwhelm the user.

Therefore, an improved approach can be beneficial for alleviating various concerns associated with conventional approaches or improving conventional approaches. Based on computer technology, the disclosed technology can provide indications of social network event anniversaries based on consideration of various factors. User social network interaction information can be utilized to determine meaningful social network event anniversaries and to provide users with an indication, such as a promotion or notification, relating to the anniversaries. Further information may be utilized to highlight those anniversaries that a user may find particularly meaningful or interesting, and to filter out anniversaries that a user may view negatively.

FIG. 1 illustrates an example system 100 including an example anniversary module 102 configured to facilitate providing users with anniversary event indications, according to an embodiment of the present disclosure. The anniversary module 102 can be configured to determine social network events relevant to a particular user that occurred on the current date in a previous year, i.e., "anniversary events." Anniversary events may include photos, videos, status messages, wall posts, friendship anniversaries, relationship status anniversaries, or any other social network event that took place on a given date in a previous year. An event, such as a social network event or an anniversary event, may also be discussed in conjunction with a "story." A "story" may refer to the visual presentation of an event, for example on a user's wall or news feed. Although the term "event" may be used herein, it should be understood that, in certain contexts, a story relating to the event may be used rather than or in addition to the event itself.

As shown in the example of FIG. 1, the anniversary module 102 can include a promotion module 104 and a notification module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The anniversary module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the anniversary module 102 can be implemented, in part or in whole, as software running on one or more computing devices or systems, such as on a server computing system or a user (or client) computing system. For example, the anniversary module 102 or at least a portion thereof can be implemented as or within an application (e.g., app), a program, or an applet, etc., running on a user computing device or a client computing system, such as the user device 710 of FIG. 7. In another example, the anniversary module 102 or at least a portion thereof can be implemented using one or more computing devices or systems that include one or more servers, such as network servers or cloud servers. In some instances, the anniversary module 102 can, in part or in whole, be implemented within or configured to operate in conjunction with a social networking system (or service), such as the social networking system 730 of FIG. 7. It should be understood that there can be many variations or other possibilities.

The promotion module 104 can be configured to create promotions which remind users of particularly noteworthy anniversary events, and to direct users to additional anniversary stories. The promotion module 104 can be configured to query a database of past social network events and to filter the past social network events according to various filtering criteria. If there are past social network events which satisfy the filtering criteria, then a promotion may be generated and presented to the user. In certain embodiments, the promotion may be presented to the user as a story in a news feed. The promotion may then direct the user to additional anniversary stories for that day.

The notification module 106 can be configured to notify users who have subscribed to and/or otherwise requested periodic (e.g., daily) notifications of anniversary events. The notification module 106 may be configured to check whether a user is subscribed to receive anniversary notifications. If the user is subscribed to receive anniversary notifications, then the notification module 106 may query a database for past social network events to collect and filter past social network events according to various filtering criteria. If there are past social network events which satisfy the filtering criteria, then an anniversary notification may be generated and presented to the user. The notification may then direct the user to additional anniversary stories for that day.

Furthermore, in some embodiments, the anniversary module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geofenced areas, maps, places, events, pages, groups, posts, communications, content, feeds, account settings, privacy settings, a social graph, and various other types of data. In some embodiments, the data store 110 can store information that is utilized by the anniversary module 102. For instance, the data store 110 can store posts made by users on the social networking system, posts on the social networking system in which users have been tagged, interactions between users on the social networking system, user preferences with regard to anniversary notifications or promotions, event popularity or relevance information, user friendship coefficient information, and any other information that may be used to carry out the present technology disclosed herein. It is contemplated that there can be many variations or other possibilities.

Figure 2:
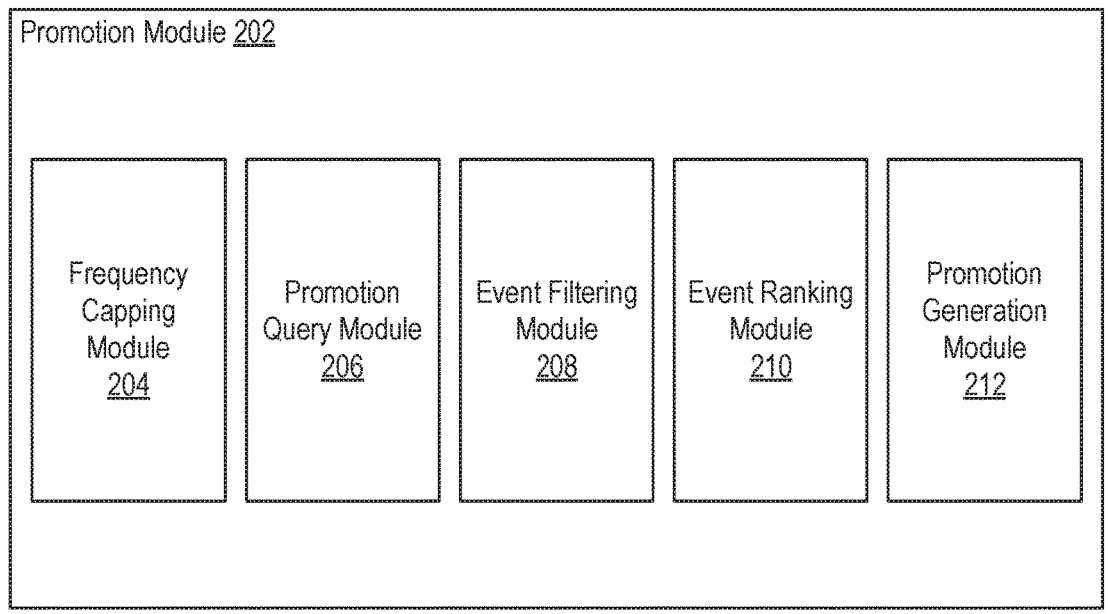
FIG. 2 illustrates an example promotion module, according to an embodiment of the present disclosure.

FIG. 2 illustrates an example promotion module 202 configured to collect one or more social network events and to generate an anniversary promotion, according to an embodiment of the present disclosure. The anniversary promotion may then be presented to the user as a news feed story to remind the user of past events. In some embodiments, the promotion module 104 of FIG. 1 can be implemented as the example promotion module 202. As shown in FIG. 2, the promotion module 202 can include a frequency capping module 204, a promotion query module 206, an event filtering module 208, an event ranking module 210, and a promotion generation module 212.

The frequency capping module 204 can be configured to determine whether a user has received an anniversary promotion within a predetermined period of time. The predetermined period of time can constitute a frequency cap. For example, the social networking system may determine that users should only receive anniversary promotions periodically, e.g., once every seven days. In this example, the frequency capping module 204 can set a frequency cap of seven days and accordingly determine whether the user has received an anniversary promotion within the last seven days. If the user has received an anniversary promotion within the frequency cap in relation to a current time, then no anniversary promotion is generated at the current time. If the user has not received an anniversary promotion within the frequency cap, then an anniversary promotion is potentially generated at the current time. Accordingly, with respect to the preceding example, if the user has received an anniversary promotion within the past seven days, then no anniversary promotion is generated. If the user has not received an anniversary promotion in the previous seven days, then the promotion module 202 can proceed with potential generation of an anniversary promotion.

In certain embodiments, users may also be given the option to see anniversary promotions more frequently, less frequently, or never. These user preferences may be accommodated by adjusting the frequency cap. If the user wishes to view anniversary promotions more frequently, then the frequency cap may be decreased (e.g., anniversary promotions can be presented once every 3 days). Alternatively, if the user wishes to view anniversary promotions less frequently, then the frequency cap can be increased (e.g., anniversary promotions can be presented once every 14 days). Finally, if the user never wishes to view anniversary promotions, then the frequency capping module 204 can be configured such that anniversary promotions are never generated.

The promotion query module 206 can be configured to query a database to collect past social network events relating to a particular user. The promotion query module 206 may collect all of the user's past social network events on the social networking system, or may limit these social network events in some fashion. For example, the promotion query module 206 may collect all of the user's social network events occurring more than a predetermined amount of time (e.g., one year) earlier than the current date. These social network events may be collected by performing a query on a database storing this information, such as the data store 110 shown in FIG. 1. In certain embodiments, it may be desirable to implement a cache to maintain the results of this query, as it may involve searching and/or sorting through very large amounts of data. Such a cache may be updated periodically to provide the most updated results.

The event filtering module 208 can be configured to take the results of the query and filter the results based on filtering criteria. Various filtering criteria may be specified by the social networking system. For example, the results of the query can be filtered to remove any events that may be considered negative events that a user may not want to be reminded of. This may include, for example, removing events involving other users that the user has removed as a connection on the social networking system (e.g., "de-friended"), removing events involving ex-significant others, or removing events involving memorialized (i.e., deceased) users. The event filtering module 208 may also apply date-based filters to remove events that did not occur on the current date (i.e., do not have their anniversary on the current date).

The event ranking module 210 can be configured to rank events based on various data. Events may be ranked based on various ranking criteria so that promotions are provided only for "top" events that will be more interesting to the user. In certain embodiments, events may be ranked based on ranking criteria that are based on social networking system activity (e.g., positive reviews, likes, comments, number of people tagged in the event, number of shares, etc.). Older events may also be given greater weight or preference so as to increase the nostalgic effect of the promotion. In order to assign rankings, events may be assigned values based on a ranking algorithm to determine event rankings.

In certain embodiments, the event filtering module 208 may perform some filtering before event ranking, and then additional filtering after event ranking. For example, the event filtering module 208 may first filter out negative events, and then the remaining events may then be ranked by the event ranking module 210, and then the event filtering module 208 may perform date filtering to yield only events that occurred on the present date. The event filtering module 208 may also perform some filtering based on the results of the event ranking module 210 to filter out any event that are not ranked as a top event (e.g., filtering out events outside the top 100 in the rankings).

The promotion generation module 212 can be configured to generate an anniversary promotion to be presented to a user. Once the events from the query are filtered and ranked, the highest ranked events may be used by the promotion generation module 212 to generate a promotion. If no events qualify (i.e., no events satisfy the filtering and/or ranking criteria), then no promotion is generated. If one or more events do qualify, then a promotion may be generated using one or more of those events. The generated promotion may then be inserted into a user's news feed on the social networking system. A user's news feed may be configured to present a plurality of stories involving the user and/or other users on the social networking system. Promotions generated by the promotion generation module 212 may be presented in the user's news feed in a manner similar to other stories in the user's news feed.

In certain embodiments, the social networking system may include a news feed algorithm which determines which stories to present in a user's news feed. The news feed algorithm may be used to rank or select different stories and determine which stories are presented on a user's news feed and/or the order that stories are presented. Promotions generated by the promotion generation module 212 may be provided to the news feed algorithm to be included in the ranking and/or ordering and presentation of news feed stories. In various embodiments, the promotions generated by the promotion generation module 212 may be given greater weight or assigned a higher ranking to ensure or guarantee that the promotion appears in the user's news feed. The promotion may be presented to users to remind them of events that took place on the current date in past years, and also to direct users to a page of other events that occurred on the current date, as described in more detail herein.

Figure 3:
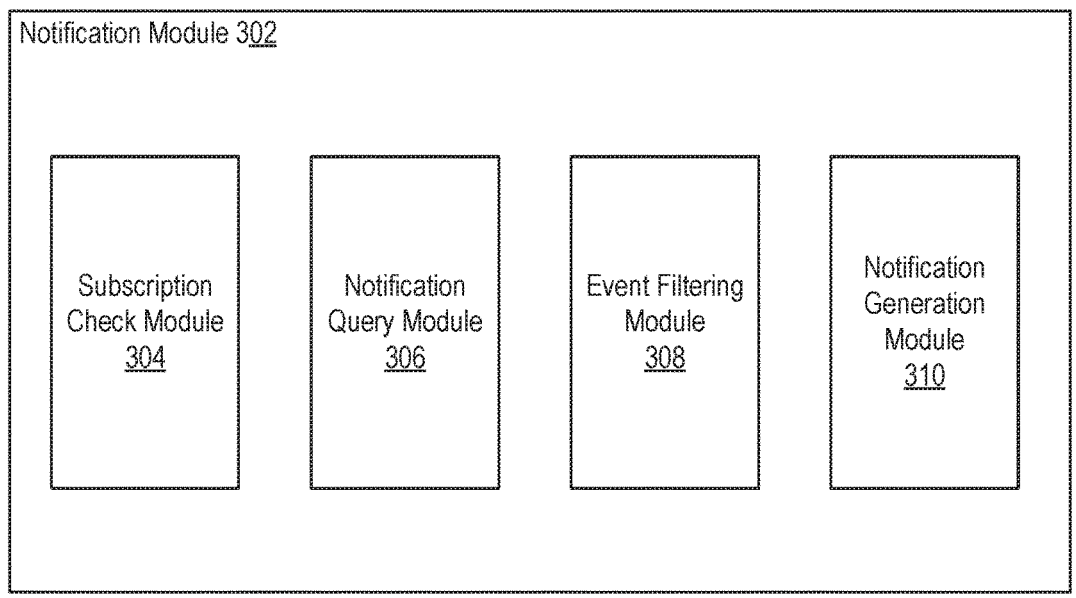
FIG. 3 illustrates an example notification module, according to an embodiment of the present disclosure.

In another aspect of the disclosed technology, users may subscribe to and be provided with notifications of anniversary events, i.e., anniversary notifications. In certain embodiments, anniversary notifications may occur daily. FIG. 3 illustrates an example notification module 302 configured to collect one or more anniversary events and generate anniversary notifications. In some embodiments, the notification module 106 of FIG. 1 may be implemented as the example notification module 302. As shown in FIG. 3, the notification module 302 can include a subscription check module 304, a notification query module 306, an event filtering module 308, and a notification generation module 310.

The subscription check module 304 can be configured to determine whether or not a user has subscribed to anniversary notifications. In certain embodiments, if a user has subscribed to anniversary notifications, then anniversary notifications can be generated for the user. On the other hand, if a user has not subscribed to anniversary notifications, then anniversary notifications are not generated for that user.

The notification query module 306 can be configured to perform queries to collect past social network events for a particular user that may be used in generating anniversary notifications. In certain embodiments, the notification query module 306 may collect only a portion of past events on the social networking system relating to the user. These events may be collected by performing a query on a database storing this information, such as the data store 110 shown in FIG. 1. In a more particular embodiment, multiple queries may be performed to collect all events occurring on the current date in each previous year. For example, if today's date is Sep. 20, 2015, then a query may be performed for Sep. 20, 2014, and another for Sep. 20, 2013, and so on for every year that the user has been a member of the social networking system. These results may then be combined to provide a listing of all events that may potentially be used to generate an anniversary notification. This complete listing may then be stored in an anniversary notification cache.

In certain embodiments, separate queries may be performed for various types of events. For example, certain types of events may be stored in a first data store, while other types of events may be stored in a second data store. In a particular embodiment, events from a user's newsfeed or wall (e.g., stories, links, status updates, photos, videos, etc.) may be stored in one data store, and friendship anniversary events (i.e., anniversaries of the date on which the user became a "friend" with another user on the social networking system) may be stored in a separate data store. The notification query module 306 may query the first data store for newsfeed and wall events, and then separately query the second data store for friendship anniversary events.

The event filtering module 308 can be configured to filter out events from the events collected by the notification query module 306 according to various filtering criteria. For example, the collected events can be filtered to remove negative events (e.g., removing events involving ex-friends, ex-significant others, or deceased users). It may also be desirable to only create notifications of friend anniversaries for those friends that are close to the user. In such a case, the event filtering module 308 may filter out friend anniversaries for any friends that do not meet certain friendship level criteria. In order to perform this function, the social networking system may calculate a "friendship coefficient" which determines the affinity between two users. This friendship coefficient may take into account the quantity and quality of interactions between the two users on the social networking system as well as friendship designations selected by the users (e.g., designating a particular user as a "Top Friend" or a "close friend"). Other considerations may also be incorporated into the friendship coefficient. The event filtering module 308 may filter out any friendship anniversaries that are not anniversaries of "close friends." "Close friends" may be designated as any friends that meet a minimum friendship coefficient, or friends that have been designated by the user as a "close friend."

The notification generation module 310 can be configured to generate an anniversary notification informing the user of anniversary events for a day. If there are events that occurred on that date and satisfy the various filtering criteria applied by the event filtering module 308, then a notification may be generated to inform that user that there are anniversary events that may be of interest to the user. The notification may then lead users to a page providing the user with one or more anniversary stories relating to the anniversary events identified by the event filtering module 308.

Figure 4A:
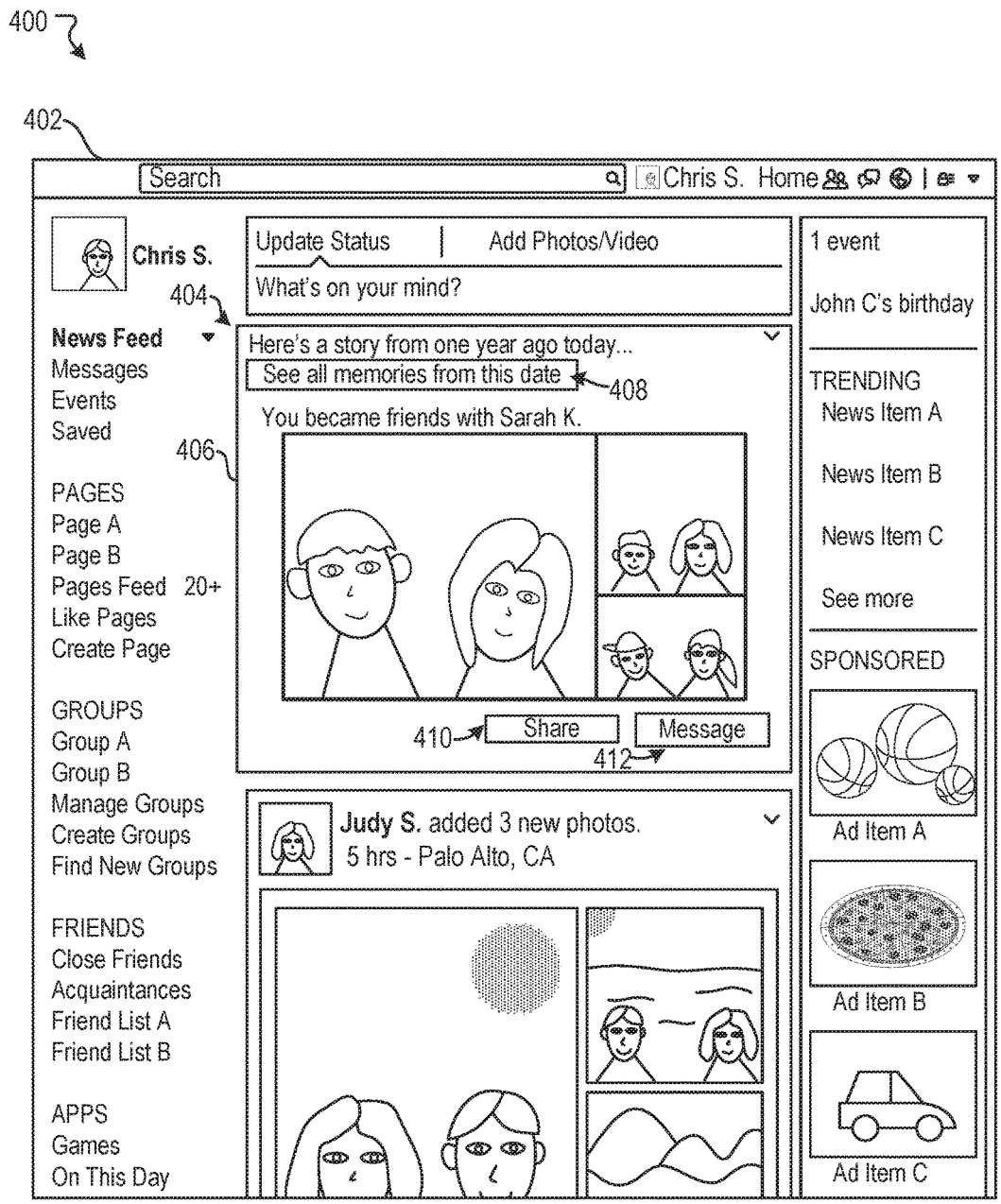
FIG. 4A illustrates an example anniversary promotion, according to an embodiment of the present disclosure.

FIG. 4A provides an example scenario 400 associated with providing an anniversary promotion to a user, according to an embodiment of the present disclosure. The example scenario 400 illustrates an interface 402 for utilizing a social networking system (such as the social networking system 730 of FIG. 7). As shown in the example of FIG. 4A, the interface 402 can provide a newsfeed 404 for a user, Chris S. The newsfeed 404 can present various content items within the social networking system to Chris S. One of the content items presented to Chris S. is an anniversary promotion 406. The anniversary promotion 406 provides a reminder of an event that took place on a current date in a previous year. The anniversary promotion 406 states that one year ago today, Chris S. became friends with Sarah K. The anniversary promotion 406 allows the user to share the event by selecting a button 410 or to send a message to Sarah K. by selecting a button 412. The anniversary promotion 406 also allows the user to "see all memories from this date" by selecting a button 408. If the user clicks on the button 408, the user is taken to a page listing all anniversary stories for the current date, an example of which is shown in FIG. 4C, discussed in greater detail below.

Figure 4B:
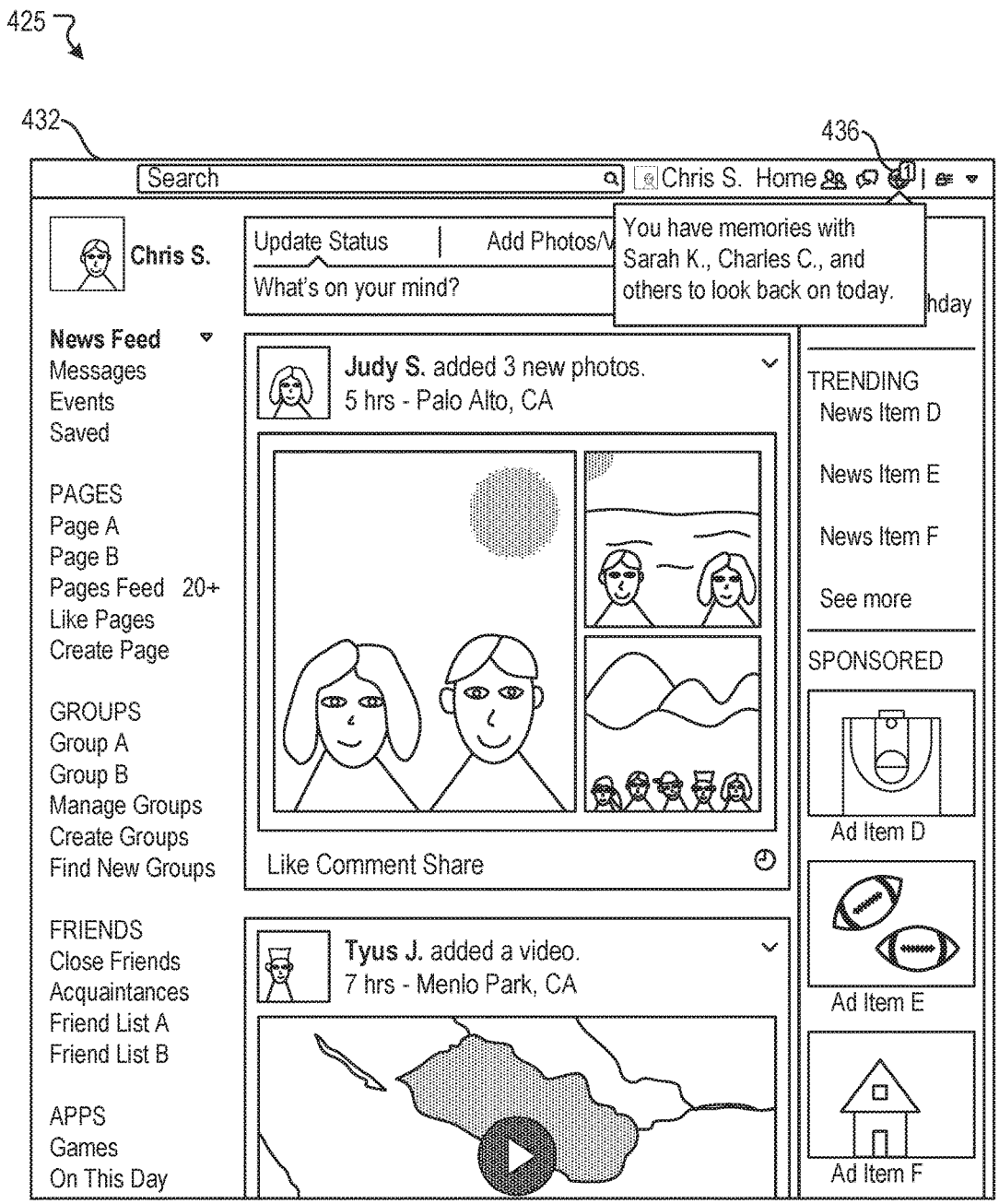
FIG. 4B illustrates an example anniversary notification, according to an embodiment of the present disclosure.

FIG. 4B provides an example scenario 425 associated with providing an anniversary notification to a user, according to an embodiment of the present disclosure. The example scenario 425 illustrates an interface 432, similar to interface 402 of FIG. 4A. In the example scenario 425, an anniversary notification 436 has been generated as discussed in connection with the notification module 302. The anniversary notification 436 is provided to the user notifying the user that he has "memories with Sarah K., Charles C., and others to look back on today." In this example, the anniversary notification 436 can be presented to the user in response to the user selecting a button to access notifications provided by the social networking system. The user can click on the anniversary notification 436 to take the user to a page listing all anniversary stories for the current date, an example of which is shown in FIG. 4C.

Figure 4C:
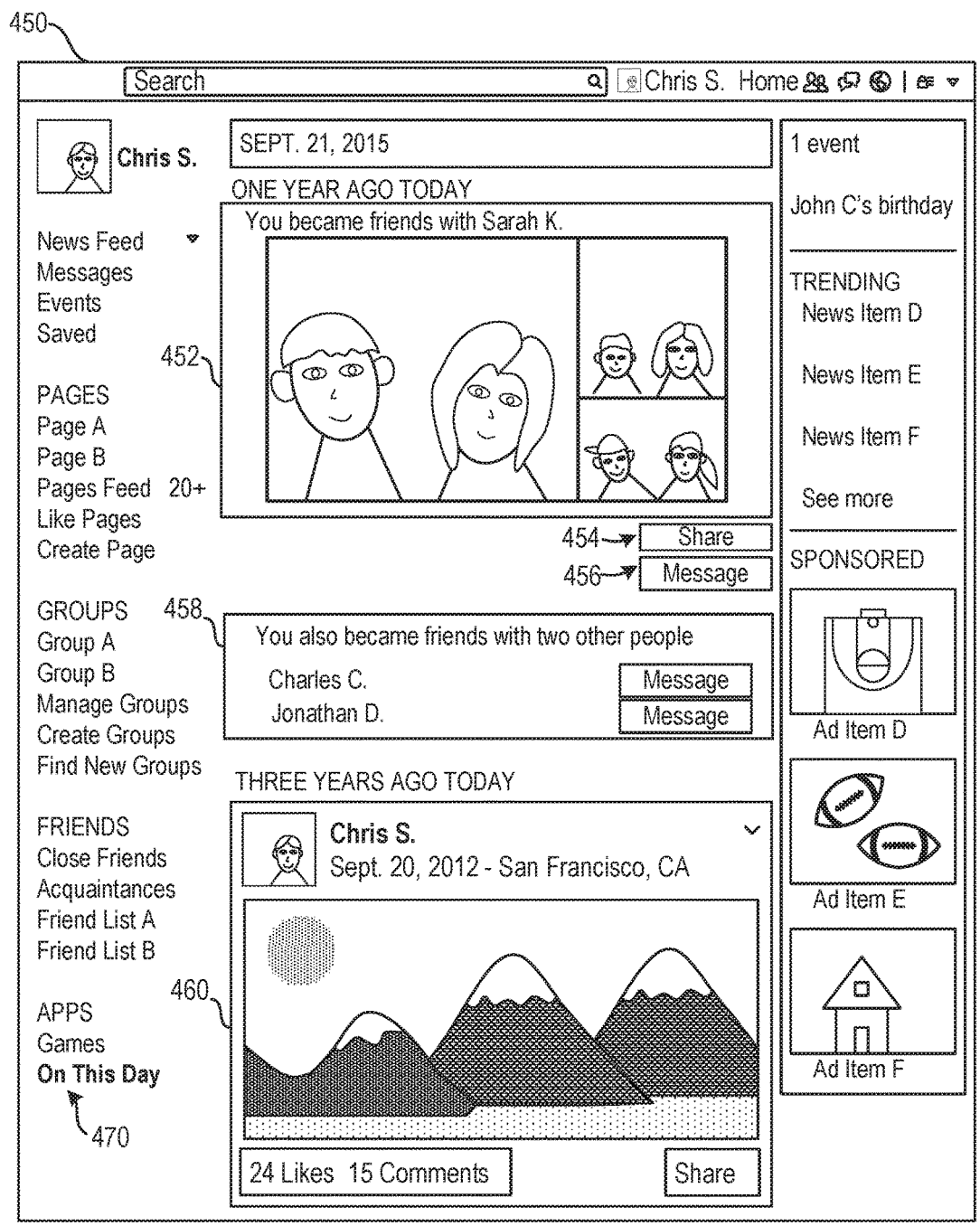
FIG. 4C illustrates an example anniversary story page, according to an embodiment of the present disclosure.

FIG. 4C provides an example anniversary story page 450, in which a user is presented with his or her anniversary stories for the day. As discussed above, when a user is presented with an anniversary promotion or an anniversary notification, the user may be directed to the anniversary story page 450 that presents to the user his or her anniversary stories for that day. A user may also access the anniversary story page 450 by clicking on a link, such as an "On This Day" link 470.

In FIG. 4C, the anniversary story page 450 includes several friendship anniversary stories 452, 458 in which three different friendship anniversaries are presented to the user. The user is also presented with an anniversary story 460 of a photograph the user posted three years ago today. Other anniversary stories may also be presented on the same page. The user is given the opportunity to share the various stories on the anniversary story page 450 of the user. The anniversary story page 450 may be viewable only by the user associated with the page, and the user may be given the option to share particular anniversary stories publicly or with a subset of other users. In the example shown, the story 452 can be shared by the user via selection of the "Share" button 454.

In certain embodiments, friendship anniversaries for "top friends" or close friends may be presented differently than friendship anniversaries for other, routine friends (e.g., friends with lower friendship coefficients or friends that have not been designated by the user as a close friend). For example, stories involving a close friend of a user may be presented with one or more images (e.g., picture, video) that depict the close friend together with the user. In contrast, stories involving a routine friend can be presented, for example, with a textual description but without images. Available space in a user interface to present a story may also be a consideration in whether the story will include one or more images.

In FIG. 4C, a story 452 relates to a friendship anniversary with a close friend, Sarah K. The story 452 states that the user became friends with Sarah K. one year ago today. Because Sarah K. is one of the user's top friends, three different photographs are shown that relate to the user's friendship with Sarah K. For example, these photographs may be photographs that include both the user and Sarah K. The anniversary story page 450 also shows two more friendship anniversary stories 458 for friends Charles C. and Jonathan D. In relation to Chris S., these users have a lower friendship coefficient or have not been designated by Chris S. as close friends, and therefore the stories 458 are not given the same treatment as the story 452. In particular, the stories 458 are presented as text information without images in this example. In other embodiments, an anniversary story for a routine friend may include an image identifying the routine friend (e.g., a profile picture), but may not include additional images celebrating the friendship anniversary.

Although FIG. 4C provides only a few examples of anniversary stories, it should be understood that other anniversary stories may be listed in anniversary story page 450.

The user may be given the option to share any stories listed on the anniversary story page 450. Users may also be given the option to send a message with other users that are involved in the stories, e.g., to reminisce with each other on these shared past experiences.

Figure 5:
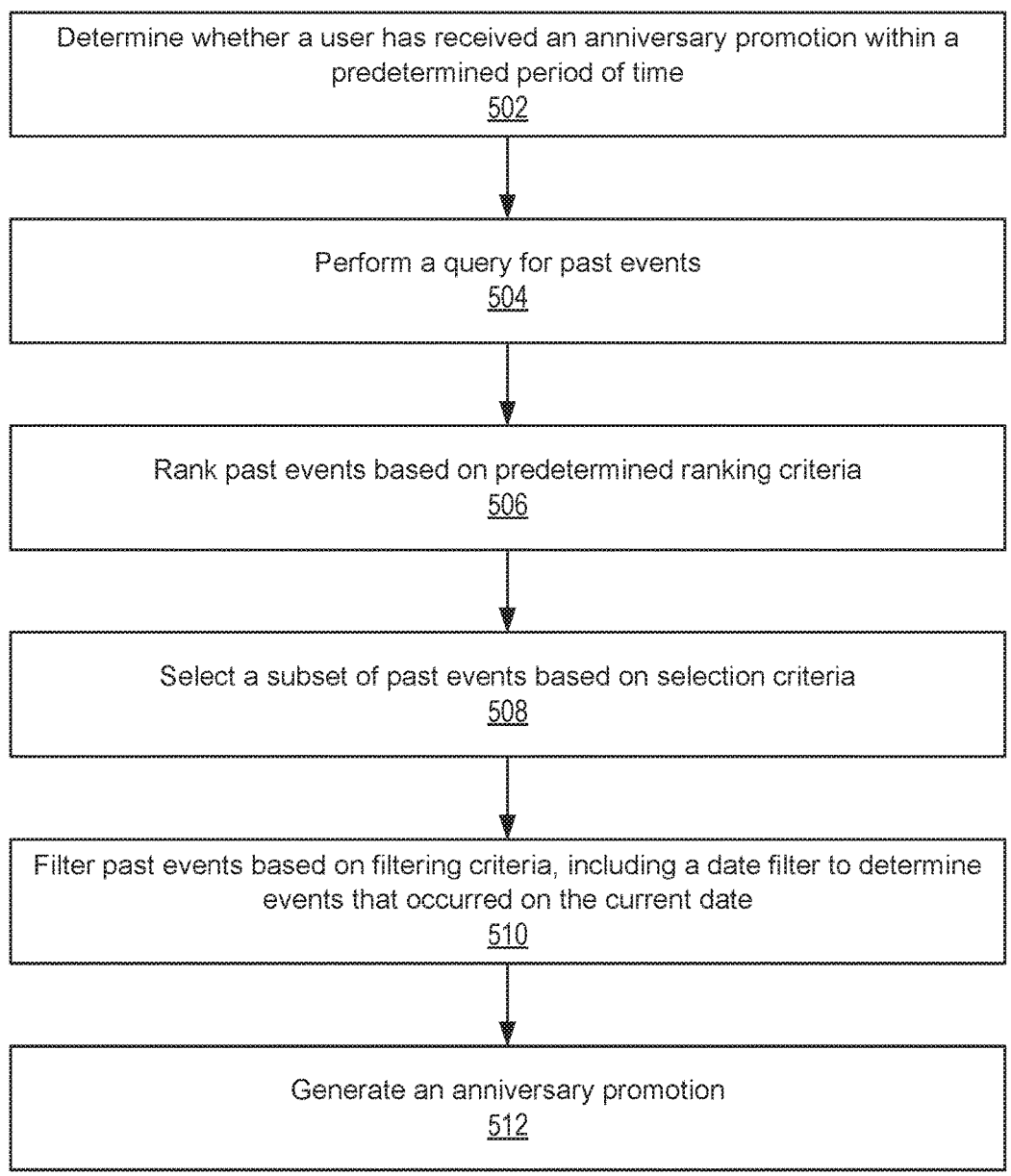
FIG. 5 illustrates an example method to generate an anniversary promotion, according to an embodiment of the present disclosure.

FIG. 5 illustrates an example method 500 associated with generating an anniversary promotion, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can determine whether a user has received an anniversary promotion within a predetermined period of time. At block 504, the example method 500 can perform a query for past events. At block 506, the example method 500 can rank past events based on predetermined ranking criteria. At block 508, the example method 500 can select a subset of past events based on selection criteria. At block 510, the example method 500 can filter past events based on filtering criteria, including a date filter to determine stories that occurred on the current date. At block 512, the example method 500 can generate an anniversary promotion promoting at least one of the previous events that satisfy the filtering criteria.

Figure 6:
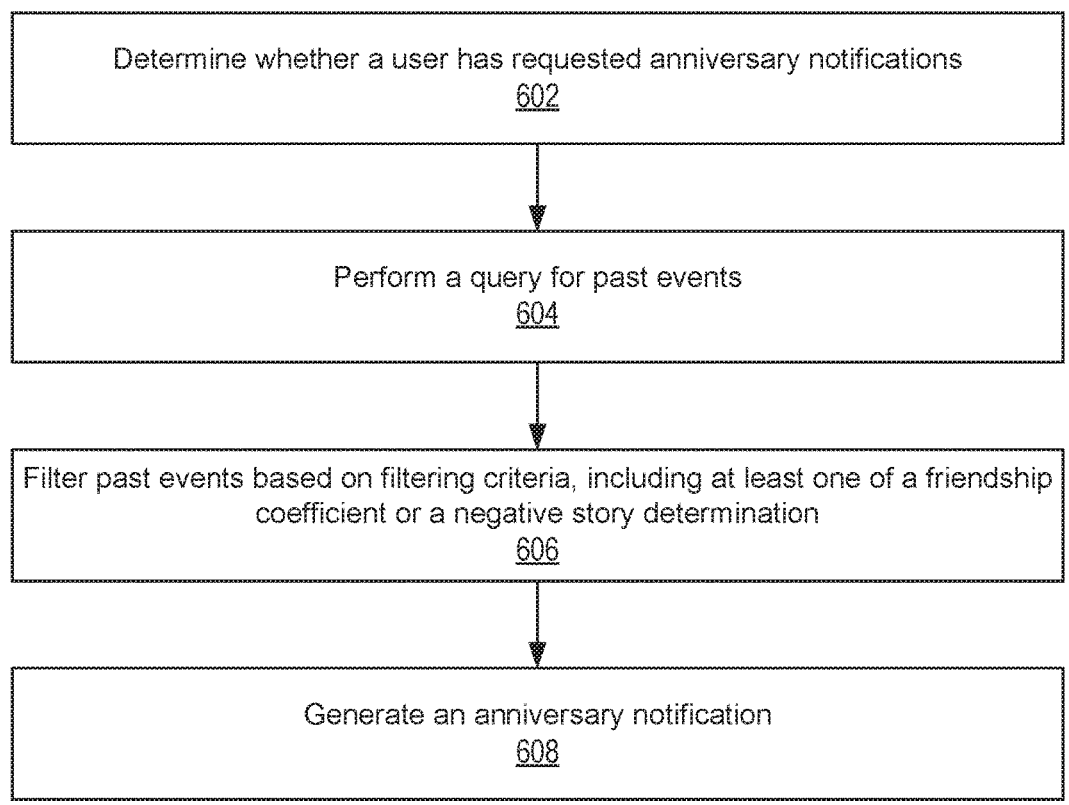
FIG. 6 illustrates an example method to generate an anniversary notification, according to an embodiment of the present disclosure.

FIG. 6 illustrates an example method 600 associated with generating an anniversary notification, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can determine whether a user has requested anniversary notifications. At block 604, the example method 600 can perform a query for past events. At block 606, the example method 600 can filter past events based on filtering criteria, including at least one of a friendship coefficient or a negative story determination. At block 608, the example method 608 can generate an anniversary notification notifying the user of anniversary events.

Social Networking System—Example Implementation

Figure 7:
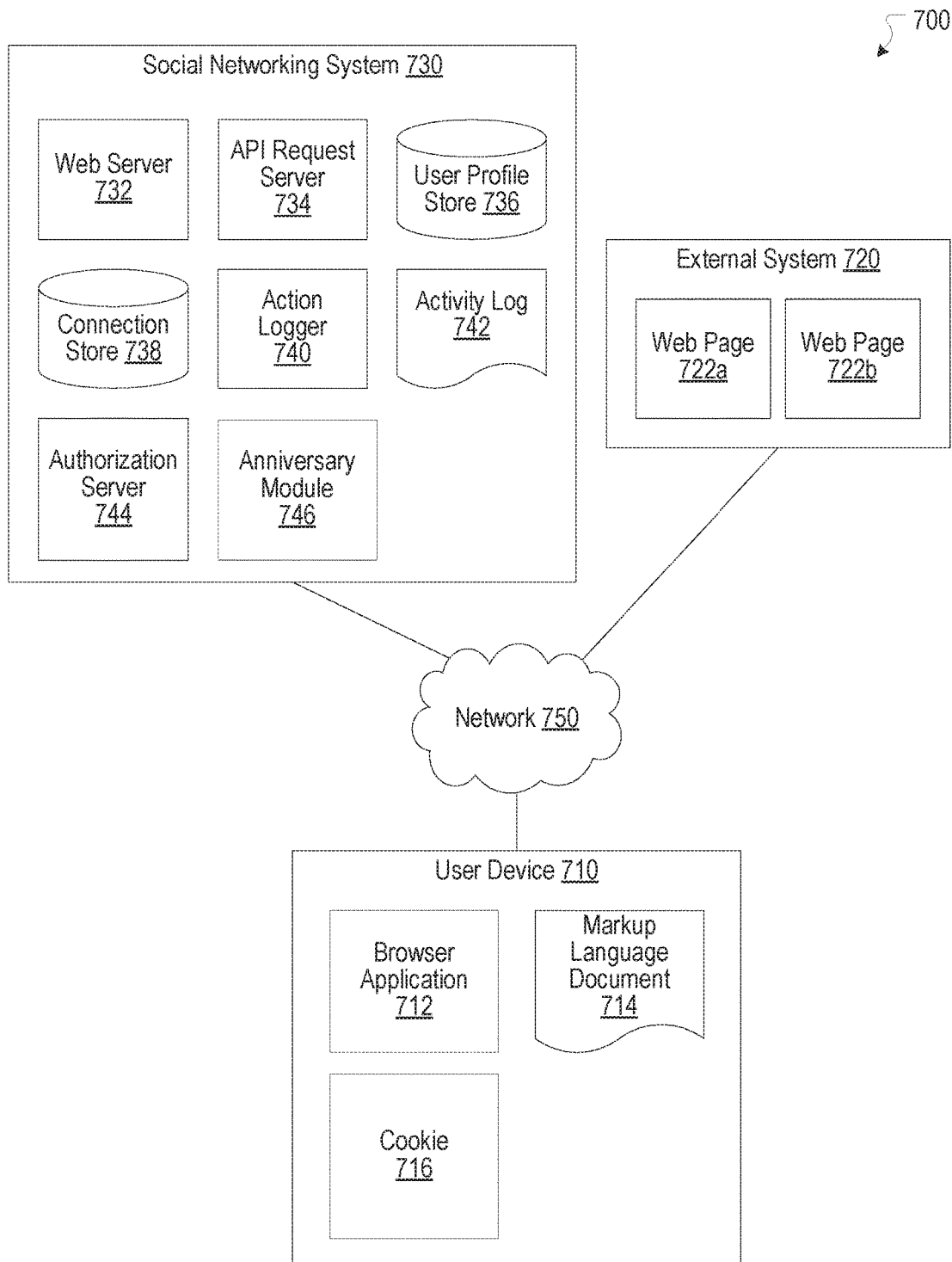
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an anniversary module 746. The anniversary module 746 can, for example, be implemented as the anniversary module 102 of FIG. 1. As discussed previously, it should be appreciated that there can be many variations or other possibilities. For example, in some instances, the anniversary module 746 (or at least a portion thereof) can be included or implemented in the user device 710. Other features of the anniversary module 746 are discussed herein in connection with the anniversary module 102.

Hardware Implementation

Figure 8:
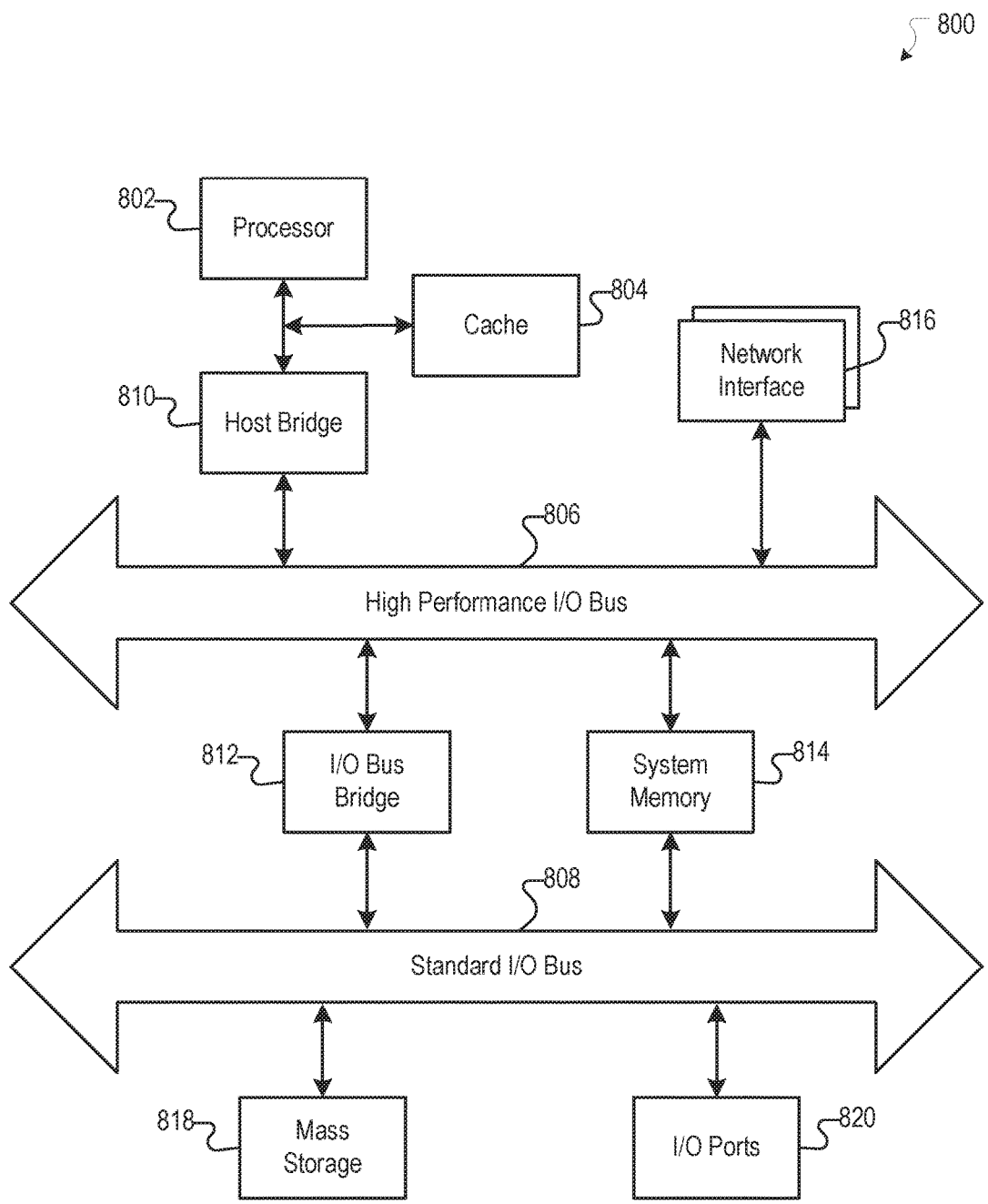
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, one or more anniversary events associated with a first user, wherein,
      the one or more anniversary events are events that took place on a social networking system,
      the one or more anniversary events occurred on the social networking system on an anniversary date that has a month and a day that is identical to a current month and a current day, and
      the one or more anniversary events comprise at least one of:
         a friendship anniversary event indicating that the first user became a connection of a second user on the anniversary date in a previous year, or
         a content post anniversary event indicating that the first user posted a content item to the social networking system on the anniversary date in a previous year;
   filtering, by the computing system, the one or more anniversary events based on filtering criteria, wherein the filtering criteria comprise a negative event filter that removes anniversary events involving at least one of an ex-friend, an ex-significant other, or a deceased user; and generating, by the computing system, an indication relating to one or more approved anniversary events, wherein the one or more approved anniversary events exclude anniversary events that have been filtered out based on the filtering criteria.

2. The computer-implemented method of claim 1, wherein the filtering the one or more anniversary events comprises:
  associating each of the one or more anniversary events with at least one of a value or a ranking;
  associating the filtering criteria with at least one of a threshold value or a threshold ranking; and
  filtering out an anniversary event that fails to satisfy at least one of the threshold value or the threshold ranking.

3. The computer-implemented method of claim 1, wherein the indication is a promotion that is presented in a news feed associated with the first user.

4. The computer-implemented method of claim 3, wherein the news feed comprises one or more news feed stories and the presentation of the one or more news feed stories is based on a news feed algorithm value associated with each news feed story, and further wherein the promotion is assigned a promotion news feed algorithm value that guarantees presentation of the promotion in the news feed.

5. The computer-implemented method of claim 3, further comprising:
  determining whether a frequency cap is satisfied,
  wherein the generating an indication relating to one or more anniversary events occurs based on satisfaction of the frequency cap.

6. The computer-implemented method of claim 1, further comprising:
  providing a close friend friendship anniversary story in a first presentation; and
  providing a regular friend friendship anniversary story in a second presentation different from the first presentation.

7. The computer-implemented method of claim 6, wherein a close friend associated with the close friend friendship anniversary story is determined by at least one of:
  a friendship coefficient that is indicative of the level of interaction between the first user and a friend on the social networking system, or
  a designation made by the first user indicating that a friend is a close friend.

8. The computer-implemented method of claim 6, wherein the first presentation of the close friend friendship anniversary story comprises one or more images including both the first user and a close friend associated with the close friend friendship anniversary story.

9. A system comprising:
  at least one processor; and
  a memory storing instructions that, when executed by the at least one processor, cause the system to perform:
    determining one or more anniversary events associated with a first user, wherein,
      the one or more anniversary events are events that took place on a social networking system,
      the one or more anniversary events occurred on the social networking system on an anniversary date that has a month and a day that is identical to a current month and a current day, and
      the one or more anniversary events comprise at least one of:
        a friendship anniversary event indicating that the first user became a connection of a second user on the anniversary date in a previous year, or
        a content post anniversary event indicating that the first user posted a content item to the social networking system on the anniversary date in a previous year;
    filtering the one or more anniversary events based on filtering criteria, wherein the filtering criteria comprise a negative event filter that removes anniversary events involving at least one of an ex-friend, an ex-significant other, or a deceased user; and
    generating an indication relating to one or more approved anniversary events, wherein the one or more approved anniversary events exclude anniversary events that have been filtered out based on the filtering criteria.

10. The system of claim 9, wherein the indication is a promotion that is presented in a news feed that is associated with the first user.

11. The system of claim 9, wherein the instructions, when executed by the at least one processor, further cause the system to perform:
  providing a close friend friendship anniversary story in a first presentation; and
  providing a regular friend friendship anniversary story in a second presentation different from the first presentation.

12. A non-transitory computer-readable storage medium including instructions that, when executed by at least one processor of a computing system, cause the computing system to perform a method comprising:
  determining one or more anniversary events associated with a first user, wherein,
    the one or more anniversary events are events that took place on a social networking system,
    the one or more anniversary events occurred on the social networking system on an anniversary date that has a month and a day that is identical to a current month and a current day, and
    the one or more anniversary events comprise at least one of:
      a friendship anniversary event indicating that the first user became a connection of a second user on the anniversary date in a previous year, or
      a content post anniversary event indicating that the first user posted a content item to the social networking system on the anniversary date in a previous year;
  filtering the one or more anniversary events based on filtering criteria, wherein the filtering criteria comprise a negative event filter that removes anniversary events involving at least one of an ex-friend, an ex-significant other, or a deceased user; and
  generating an indication relating to one or more approved anniversary events, wherein the one or more approved anniversary events exclude anniversary events that have been filtered out based on the filtering criteria.

13. The non-transitory computer-readable storage medium of claim 12, wherein the indication is a promotion that is presented in a news feed that is associated with the first user.

14. The non-transitory computer-readable storage medium of claim 12, wherein the instructions, when executed by at least one processor of a computing system, further cause the computing system to perform:

providing a close friend friendship anniversary story in a first presentation; and providing a regular friend friendship anniversary story in a second presentation different from the first presentation.

* * * * *